United States Patent [19]
Van Wienen

[11] Patent Number: 4,652,859
[45] Date of Patent: Mar. 24, 1987

[54] ALARM REPORTING SYSTEM

[75] Inventor: James L. Van Wienen, Valparaiso, Ind.

[73] Assignee: NTC Electronics, Inc., Broadview, Ill.

[21] Appl. No.: 725,634

[22] Filed: Apr. 22, 1985

[51] Int. Cl.$^4$ ............................................. G08B 23/00
[52] U.S. Cl. .................................. 340/503; 340/502; 340/531; 340/539; 379/40
[58] Field of Search ............... 340/503, 502, 504, 505, 340/506, 539, 531, 514, 500, 825.06, 825.29, 825.44, 825.45, 825.47, 825.48, 825.54; 179/5 R; 455/89, 95, 53, 54

[56] References Cited

U.S. PATENT DOCUMENTS

| | | | |
|---|---|---|---|
| 3,914,692 | 10/1975 | Seaborn, Jr. | 340/539 |
| 4,092,643 | 5/1978 | Stolarczyk | 340/539 |
| 4,354,275 | 10/1982 | Bouyssonnouse et al. | 340/539 |
| 4,455,551 | 6/1984 | Lemelson | 340/539 |
| 4,539,557 | 9/1985 | Redshaw | 340/531 |
| 4,559,526 | 12/1985 | Tani et al. | 340/539 |

Primary Examiner—Donnie L. Crosland
Attorney, Agent, or Firm—Dressler, Goldsmith, Shore, Sutker & Milnamow

[57] ABSTRACT

An alarm system for monitoring alarm conditions and for generating alert signals responsive thereto. The alarm system includes alarm signal processing circuitry for generating signals responsive to alarm conditions, control circuitry coupled to both transmitter and receiver control circuitry which are in turn coupled to a plurality of transceivers located about a selected site. Message control coupled to a recorded audio message unit transmits selected messages, via the transceivers, to portable remote units. Remote personnel respond to signals or messages from the alarm system by means of a portable radio with a built in keyboard In the event that an appropriate response is not received by the control system, dialer control circuitry places a phone call to a predetermined assistance seeking number and a prerecorded message from the message unit states the alarm condition and location.

19 Claims, 18 Drawing Figures

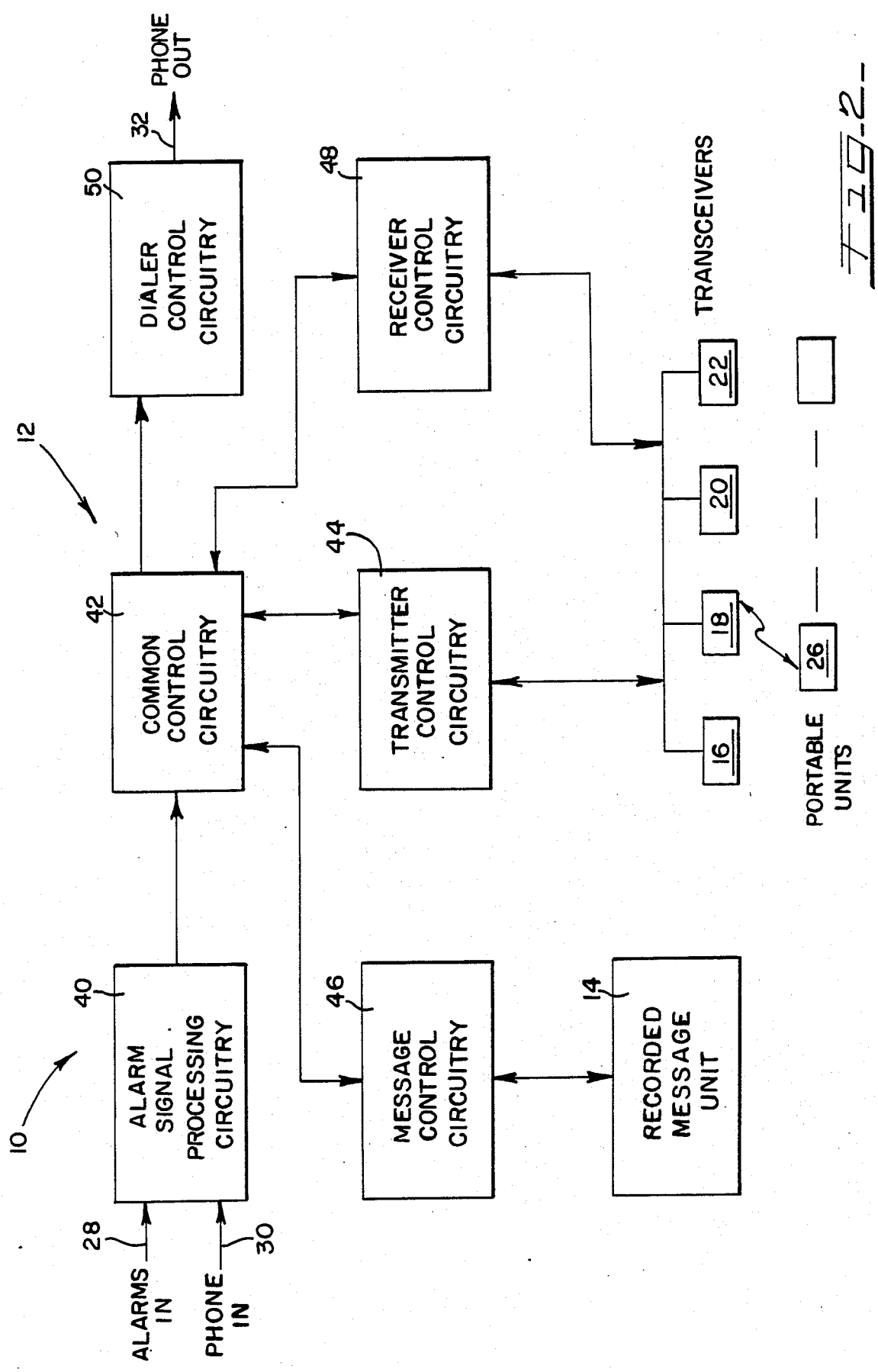

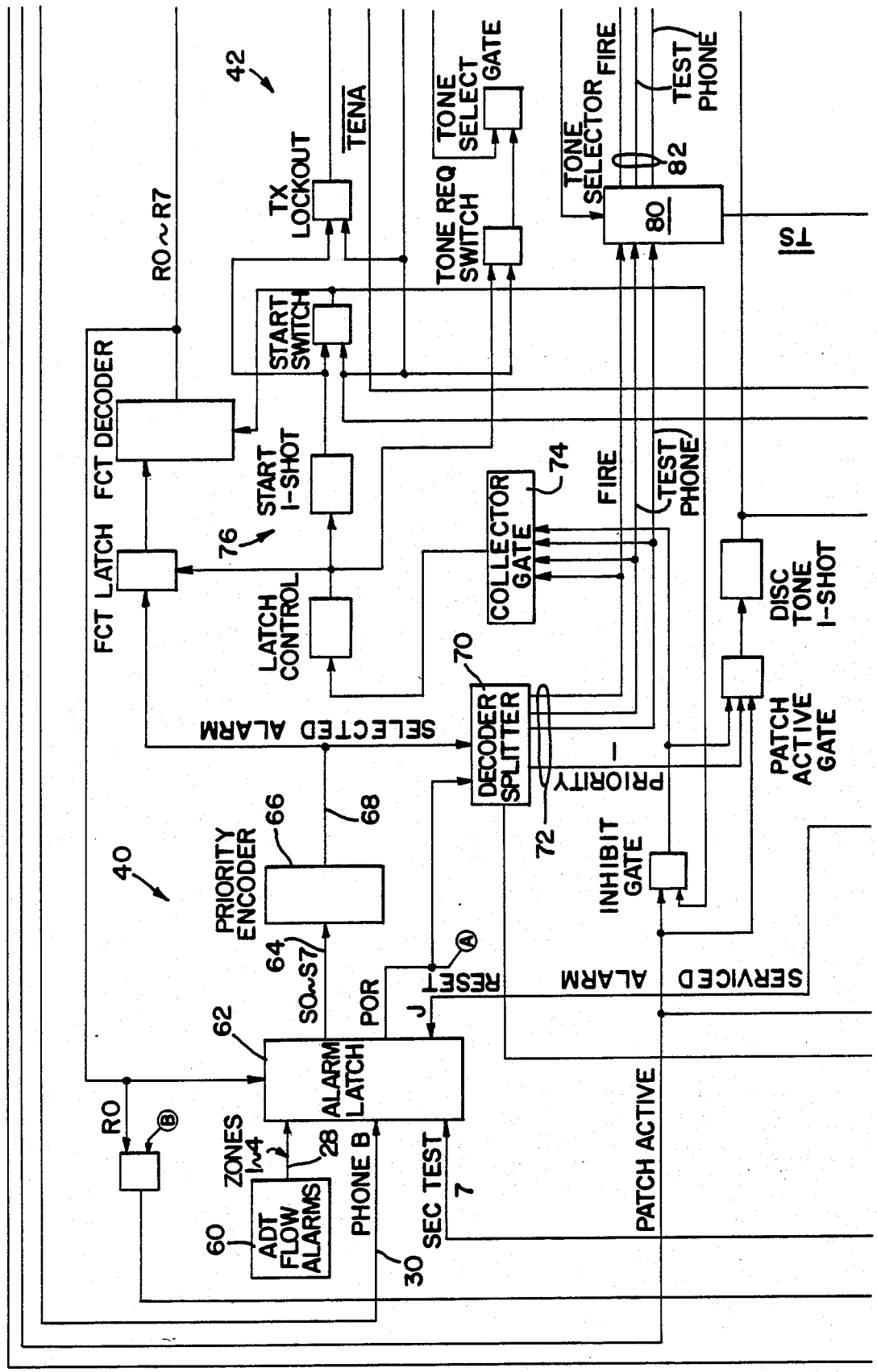

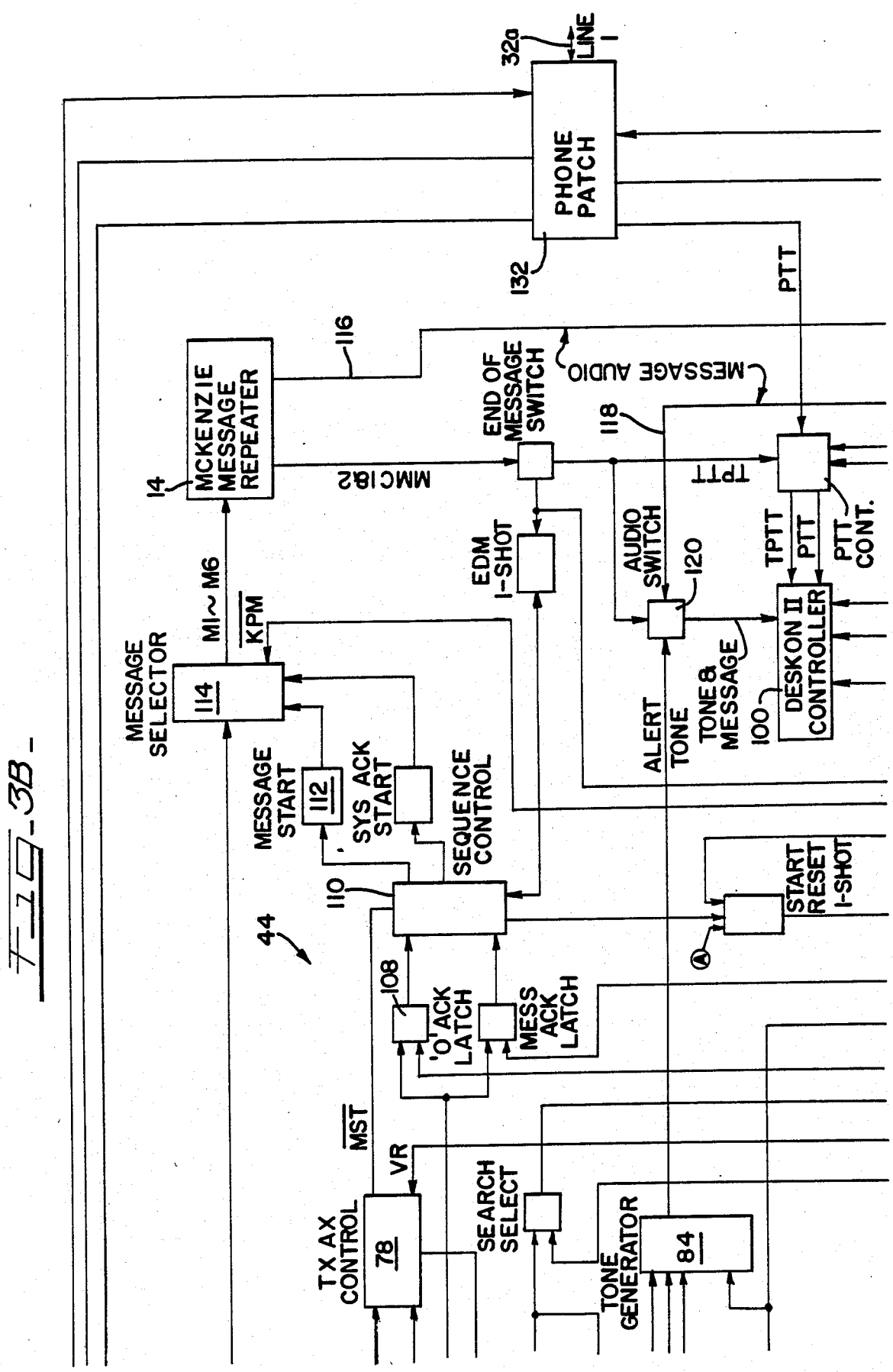

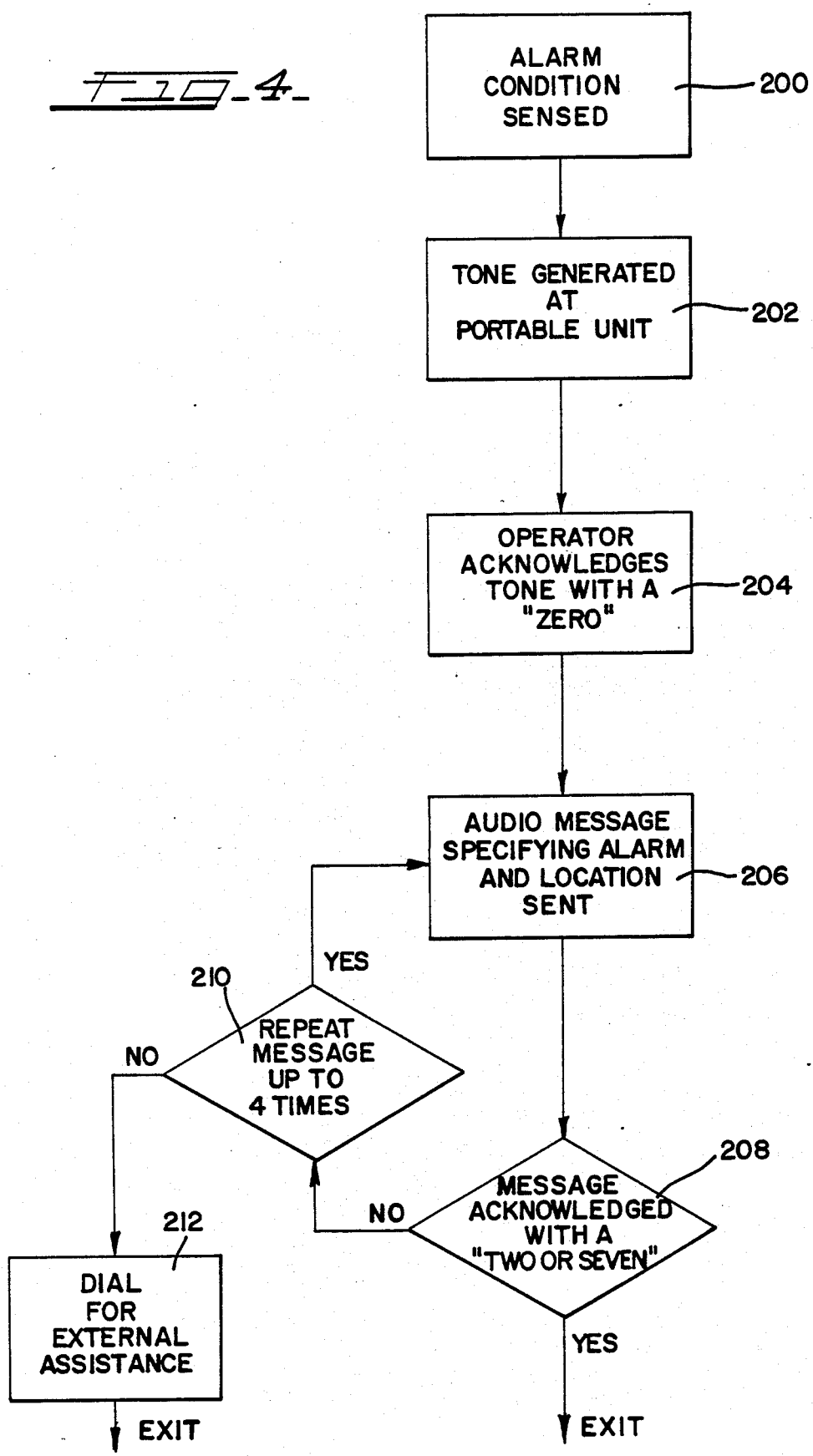

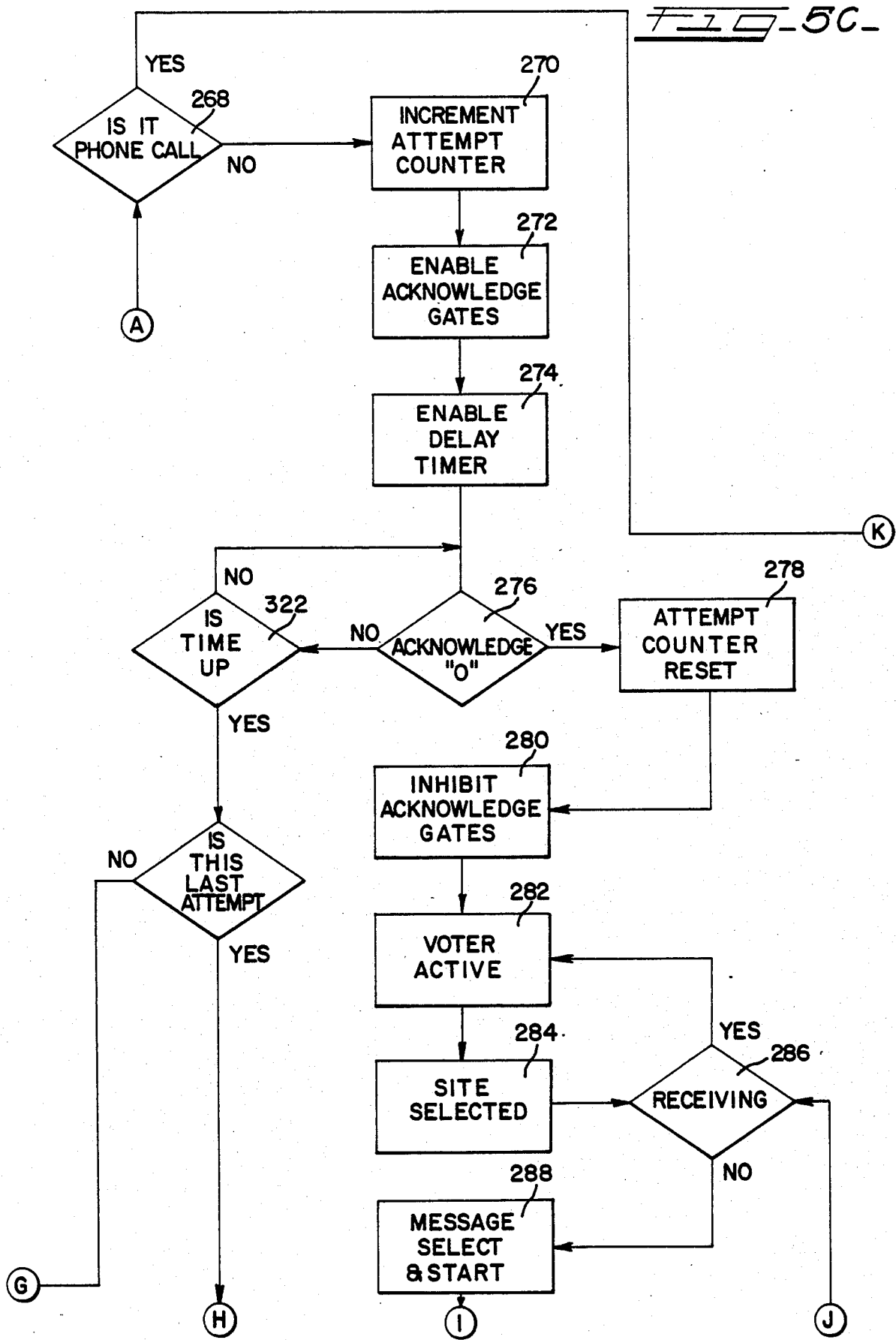

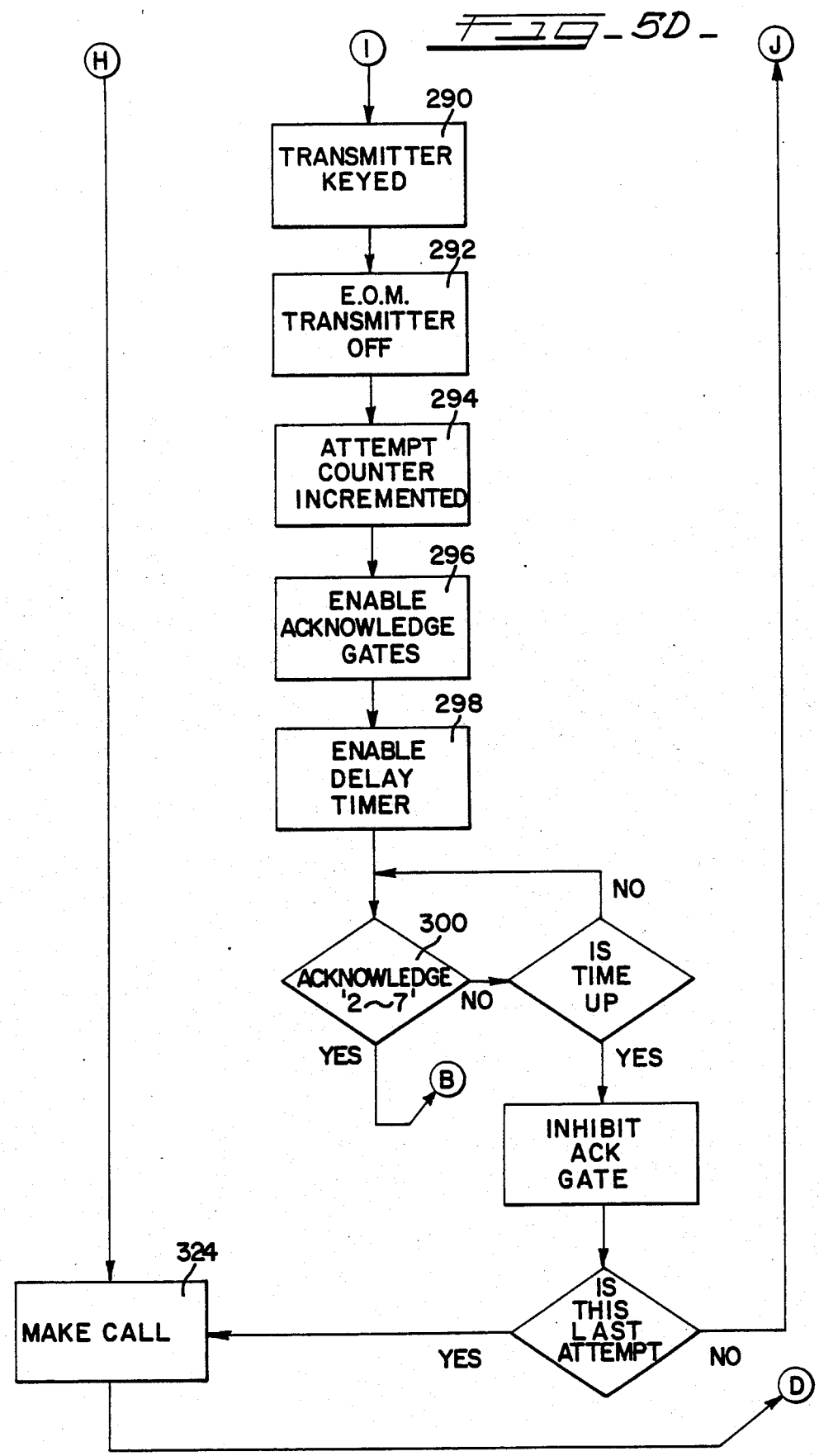

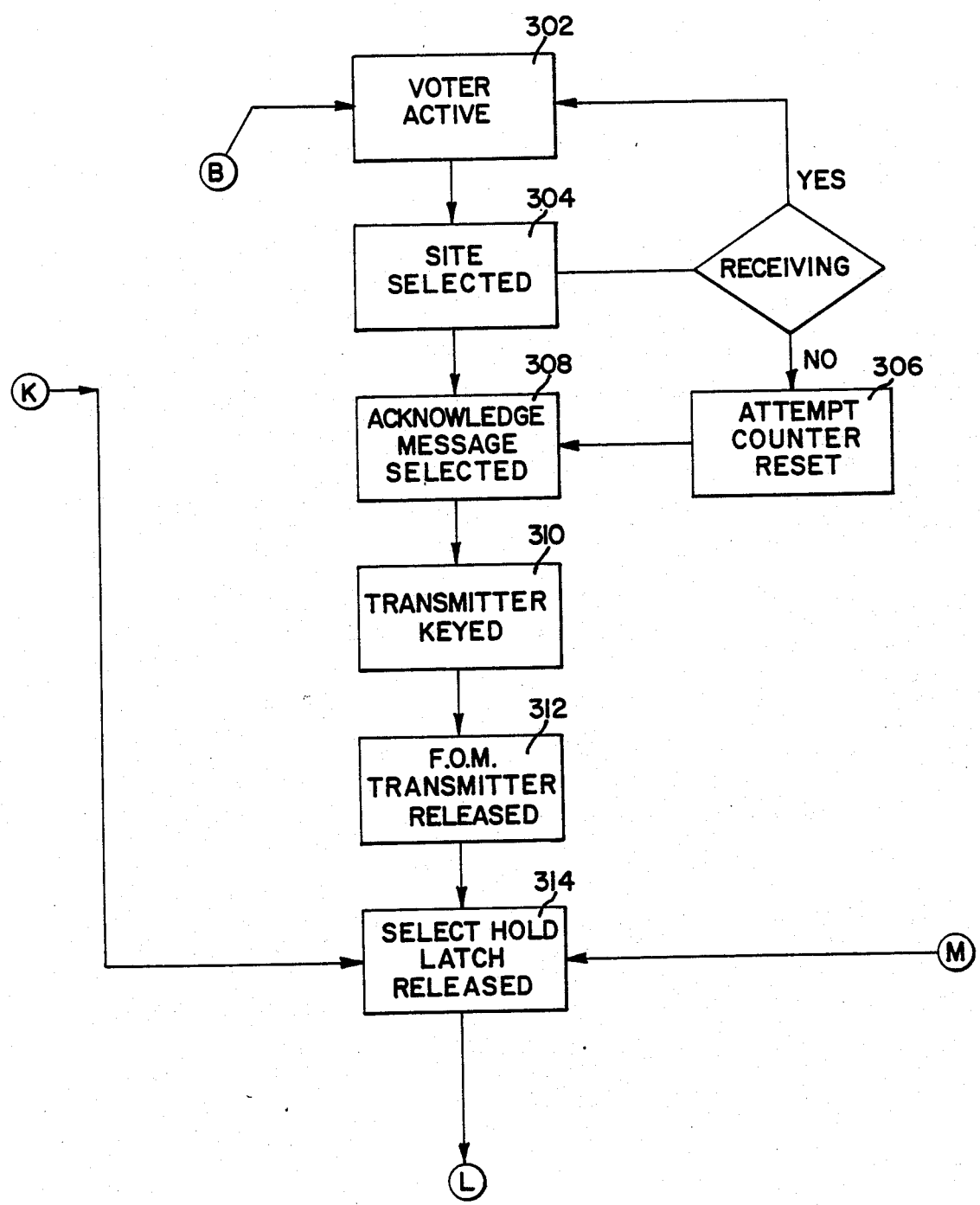

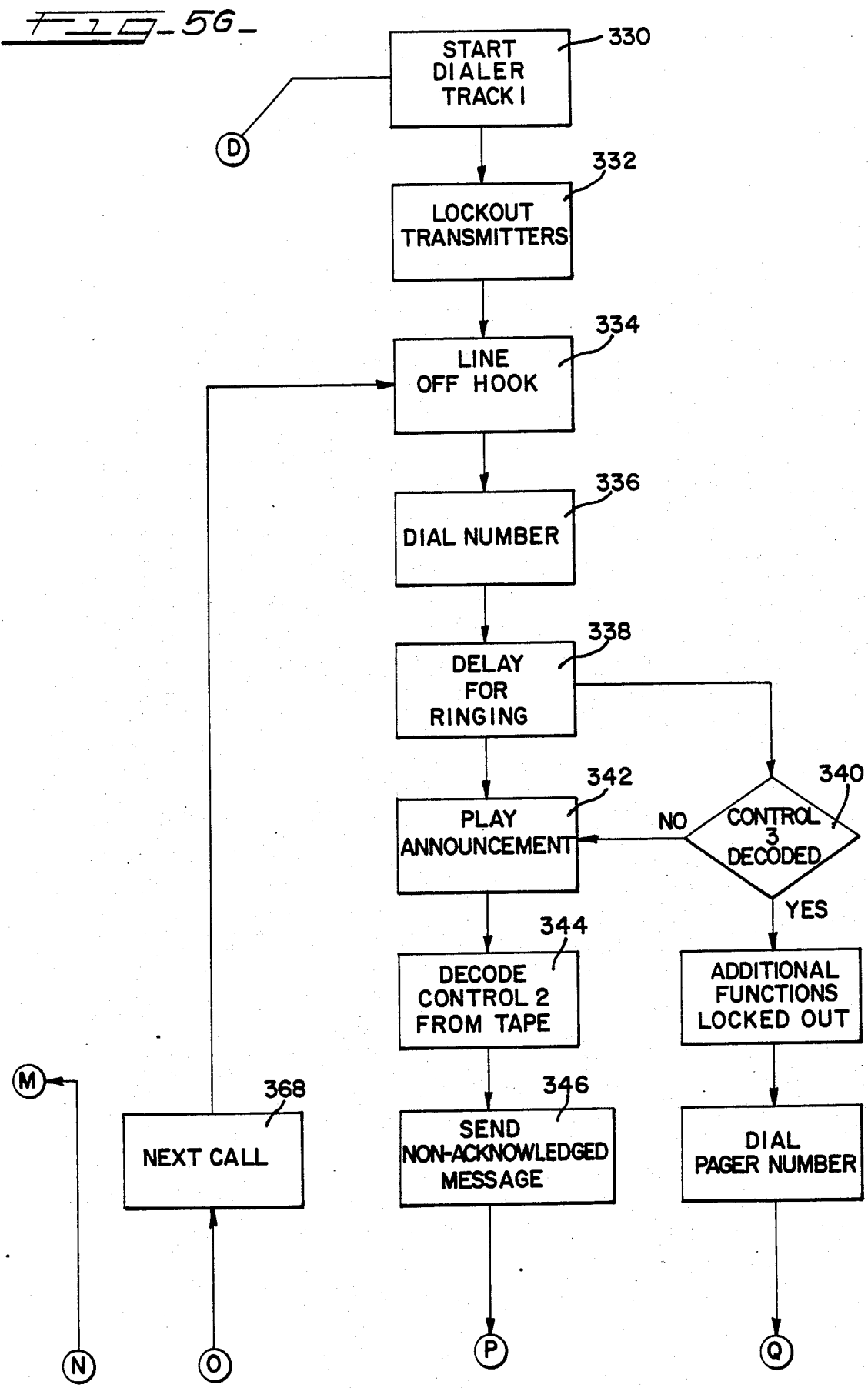

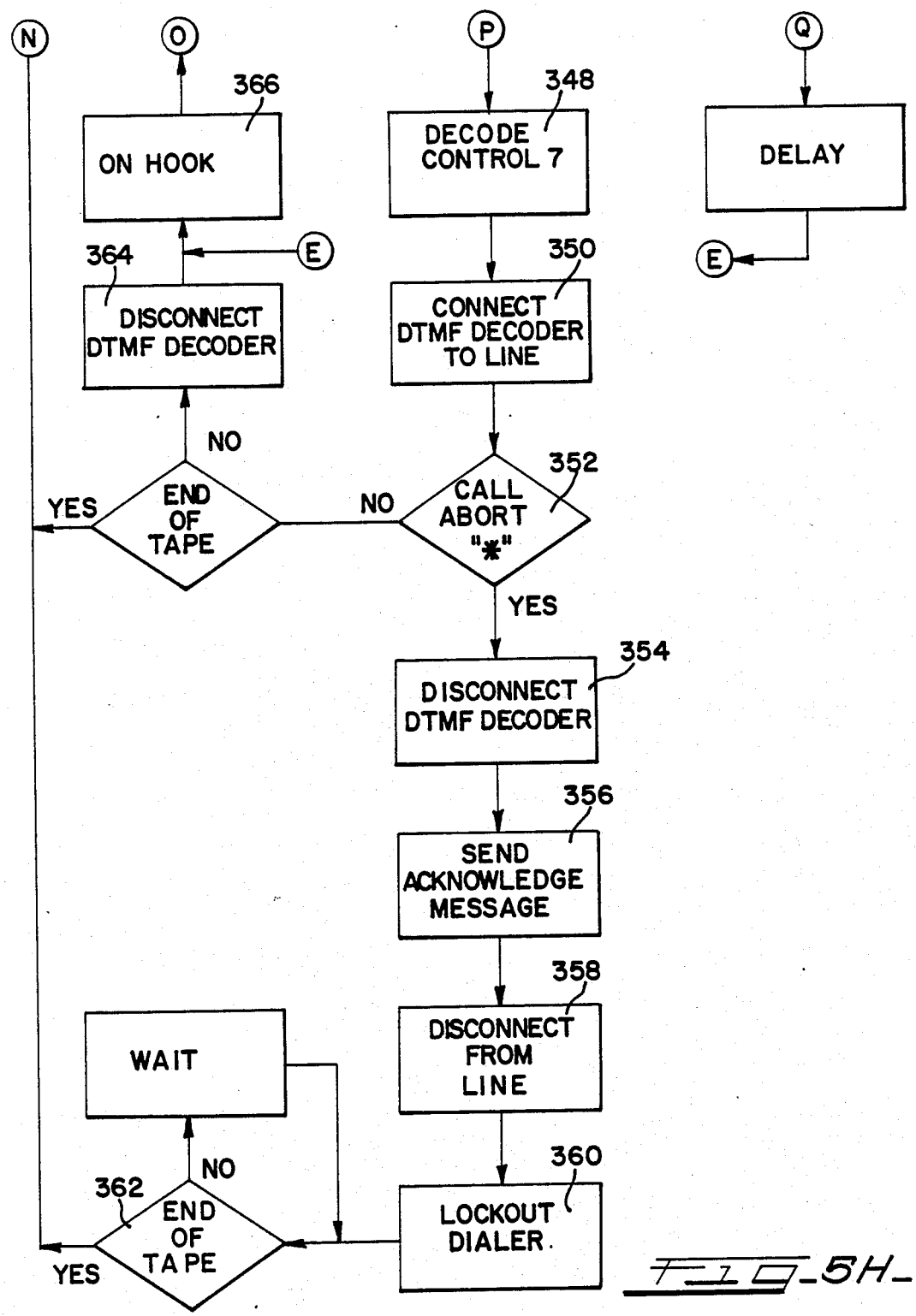

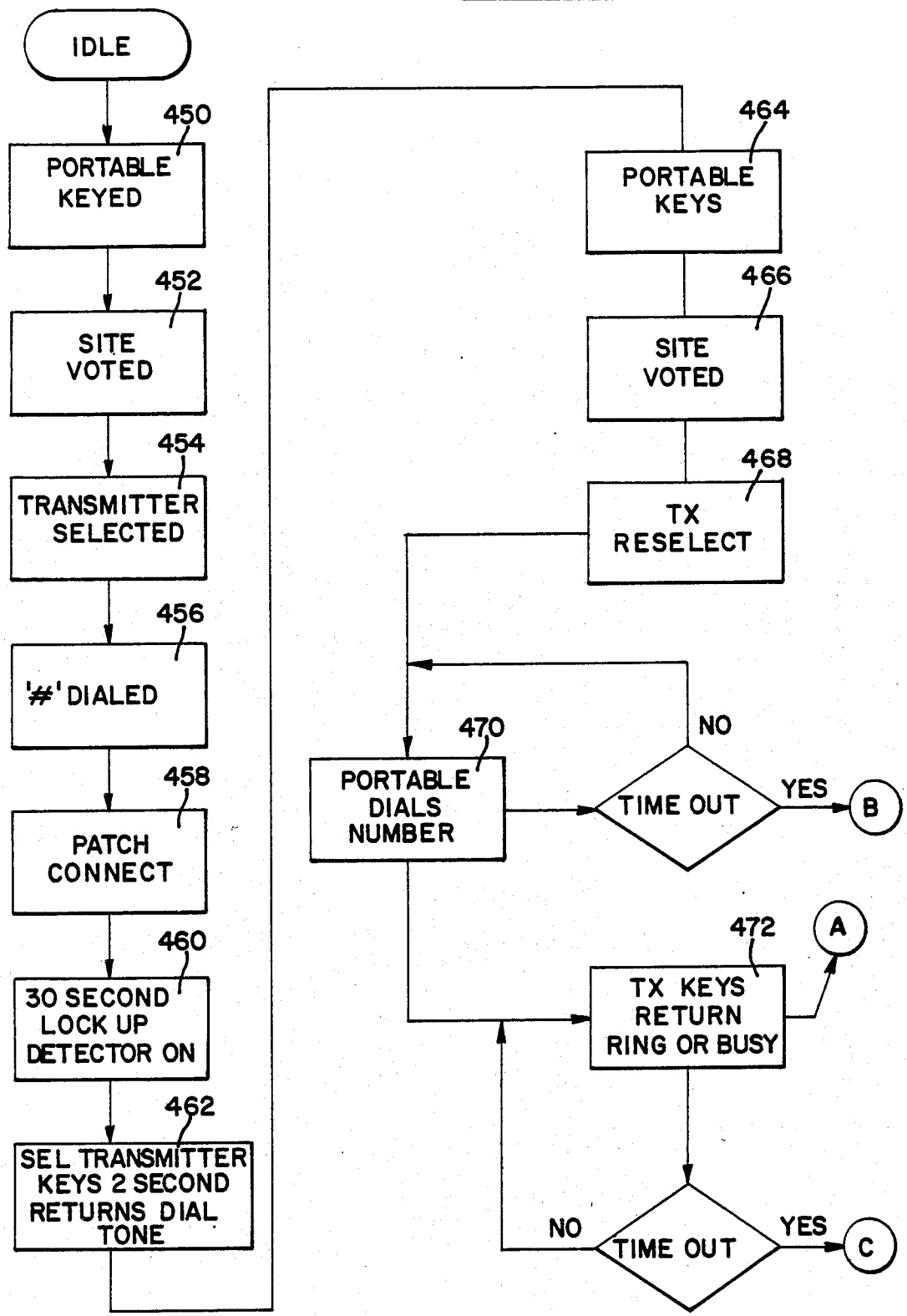
FIG_6C

ALARM REPORTING SYSTEM

FIELD OF THE INVENTION

The invention pertains to alarm and monitoring control systems. More particularly the invention pertains to an alarm and communication system which monitors a plurality of alarm sensors and which can communicate an alarm condition to one or more remote personnel for investigation and examination.

BACKGROUND OF THE INVENTION

It has long been known to use fire, smoke or liquid sensing devices, along with intrusion sensors, to monitor conditions throughout a facility or institution from a central control room. Signals from the various types of alarm sensors are communicated to the control room via hardwiring, or perhaps by radio signals, and can be converted to visual or audio alarms for the purpose of enabling an operator to identify and determine the location of the alarm condition. Also, it has been known to use two way radio communication links to enable the operator in the central control or supervisory room to communicate with on site personnel who are equipped with two way radios. The on site personnel can be directed to the location of the alarm and can be advised as to the nature of the alarm prior to arriving at that site.

Such systems require the presence of an operator in the control room but perform quite satisfactorily during hours when enough personnel are available. However, there is a continuing need in the alarm and monitoring field for alarm and monitoring systems which will function without the requirement of an operator in the control room, e.g., during off hours or weekends. Generally, under such conditions, personnel are available throughout the site to investigate alarm conditions as needed. However, such personnel do not have access to the information being provided within the control room from the distributed sensors.

SUMMARY OF THE INVENTION

In accordance with the invention, an alarm system is provided. The present alarm system can be used to monitor a plurality of fixed sensors distributed throughout a selected space or region.

The alarm system includes alarm signal processing circuits for sensing a selected alarm condition. Control circuits process the sensed alarm condition and generate an alert signal responsive thereto. A plurality of transceivers is provided for transmitting the alert signal throughout the selected region.

A portable receiver-transmitter unit is provided for receiving the alert signal and for generating an audio indicia thereof. The unit includes manually operable means for generating an acknowledge signal responsive to the alert signal. Circuits are provided in the system for receiving the acknowledge signal. A recorded message unit and associated message control circuits generate and transmit to the portable unit a verbal message or directive identifying the sensed alarm and location thereof.

Circuits can also be provided for sensing a second acknowledge signal generated by the portable unit. One of a plurality of transceivers distributed throughout the region can be selected by voting circuits. The alert signal can be transmitted a plurality of times in the event an acknowledge signal is not received within a predetermined time interval.

A method of sensing an alarm condition is also provided. The method includes the steps of:
sensing a selected alarm condition;
generating an alert signal responsive thereto;
transmitting the alert signal throughout a selected region;
receiving the alert signal and generating an audio indicia thereof;
generating an acknowledge signal responsive to the alert signal;
receiving the acknowledge signal; and
generating a verbal message or directive identifying the sensed alarm and the location thereof.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWINGS

FIG. 2 is a more detailed schematic block diagram of the alarm sensing system of FIG. 1;

FIGS. 3A–3D together disclose a detailed electronic schematic of an alarm sensing system embodying the present invention;

FIG. 4 is an overall flow diagram of the operation of the alarm sensing system of FIG. 3;

FIGS. 5A–5H together disclose a detailed flow diagram illustrating various aspects of the operation of the alarm sensing system of FIGS. 3A–3D.

DETAILED DESCRIPTION OF PREFERRED EMBODIMENT

Figure 1:
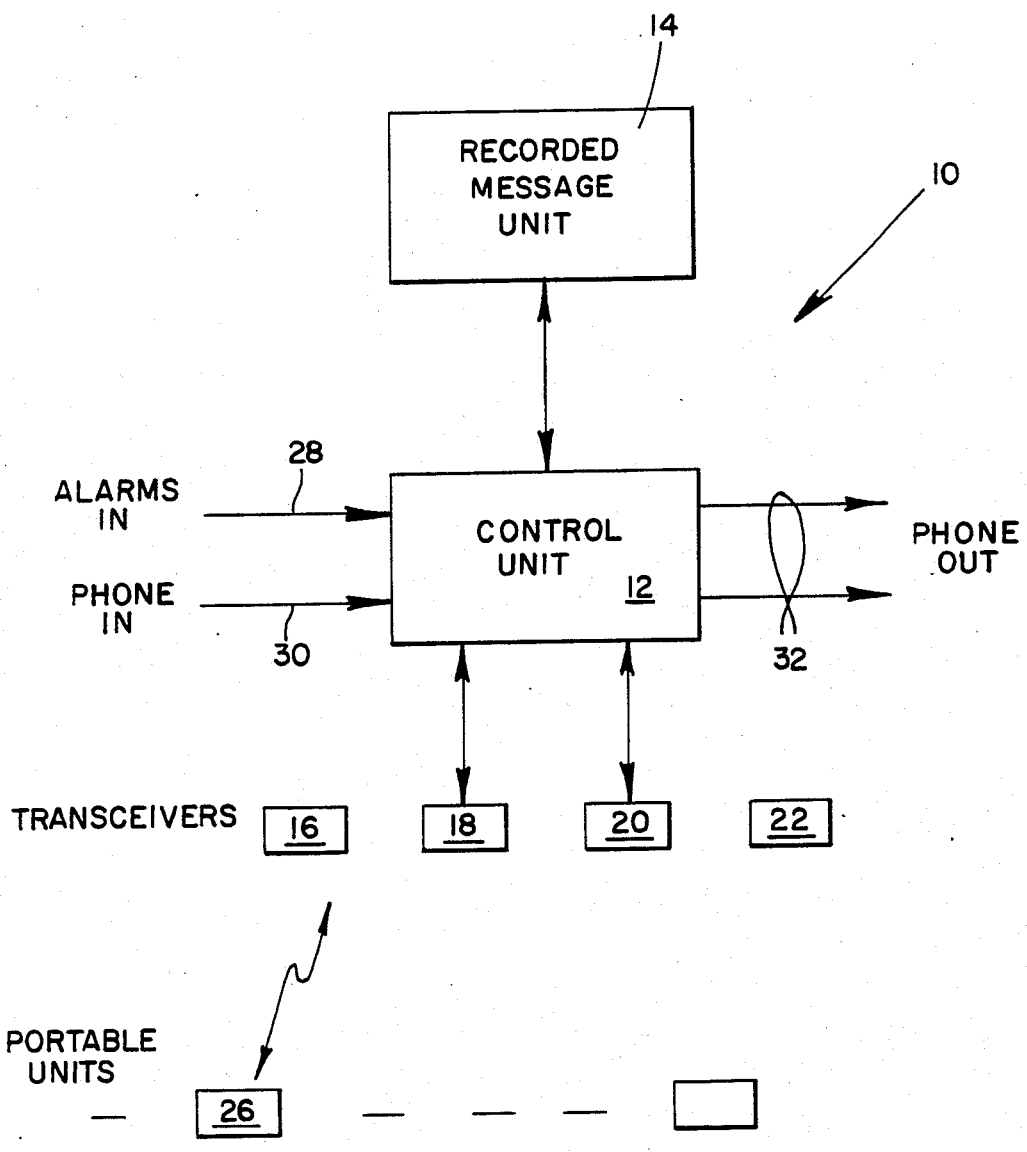
FIG. 1 is an overall block diagram of an alarm sensing system embodying the present invention.
Figure 3C:
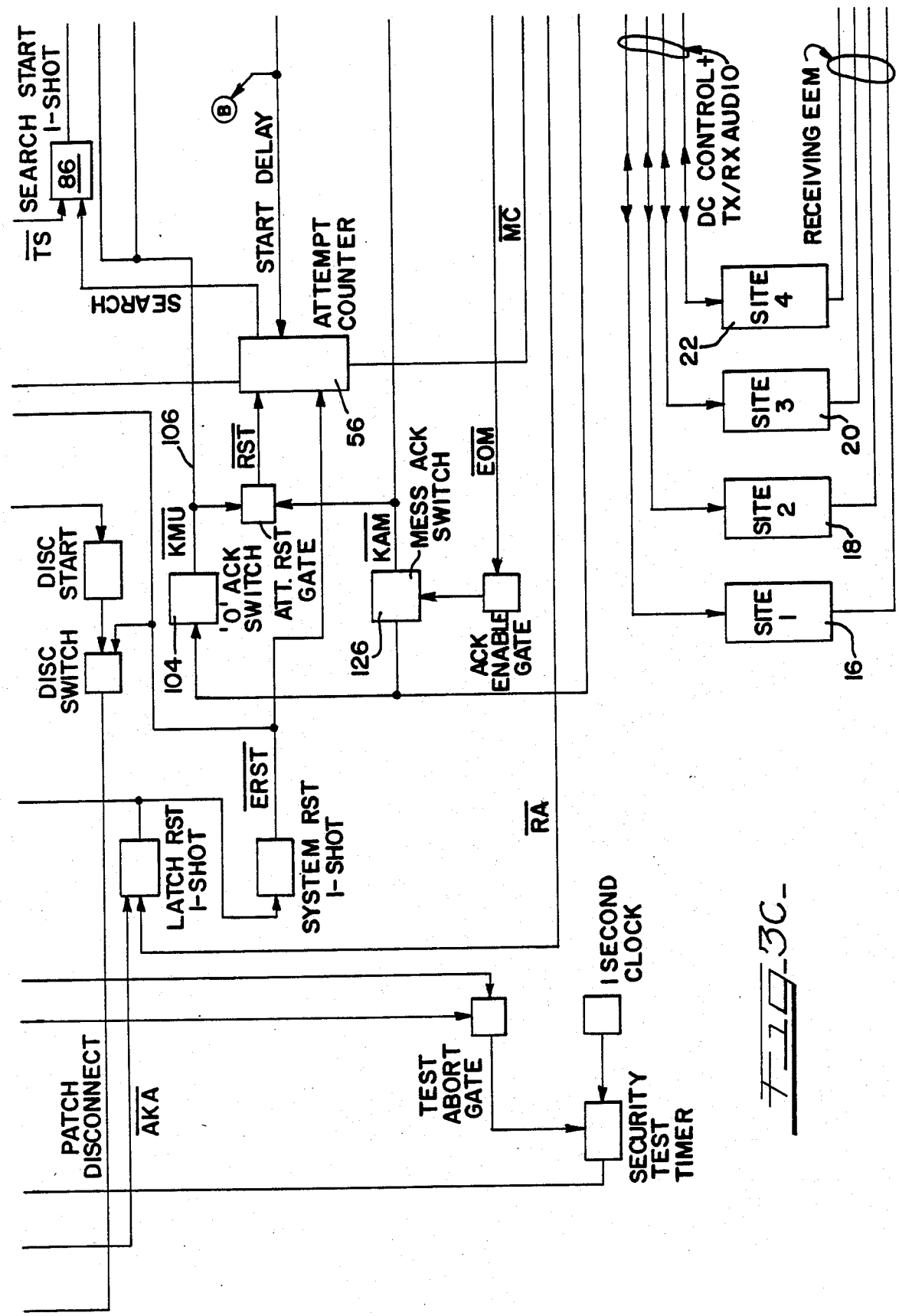
Figure 3D:
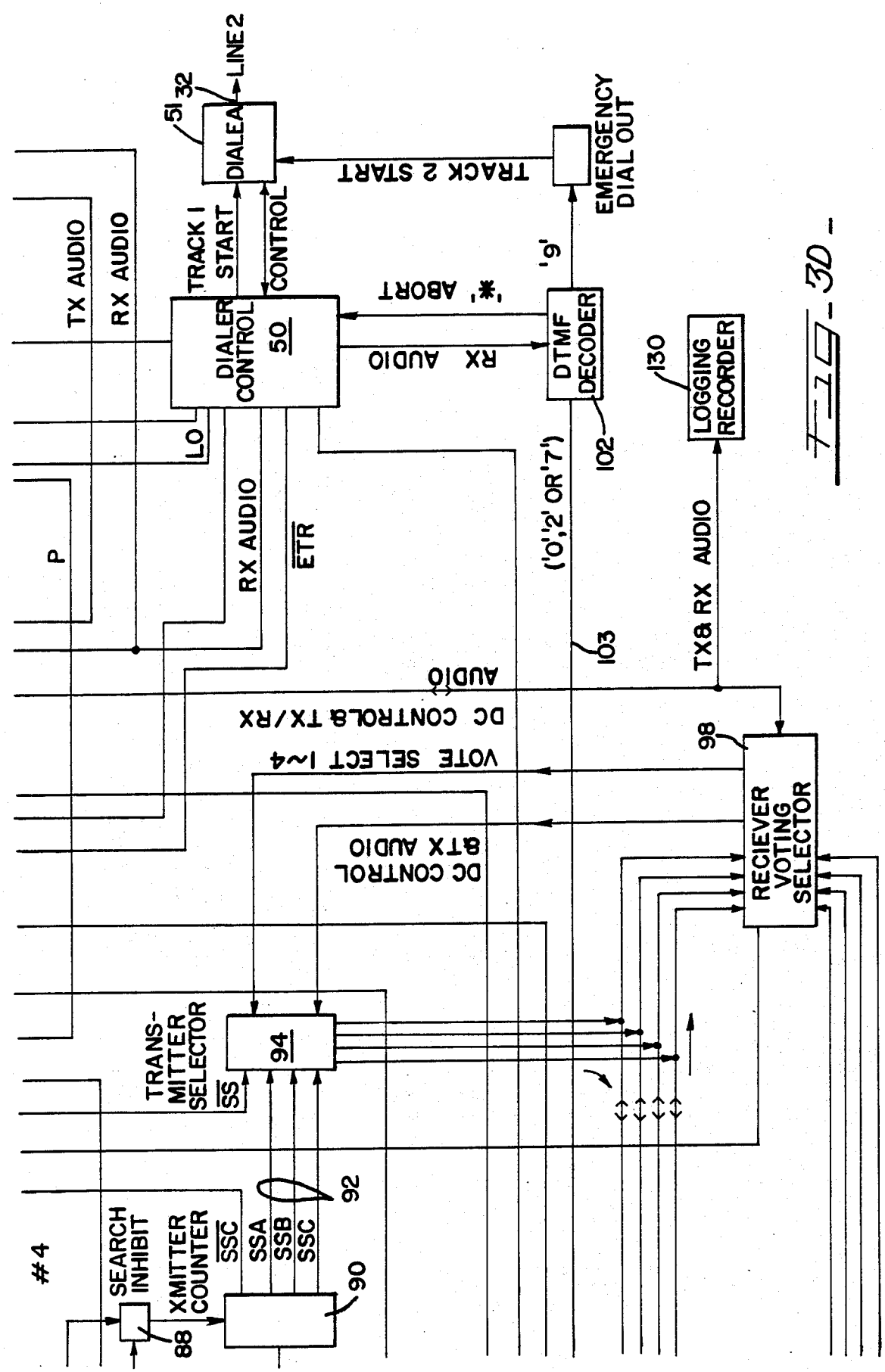
Figure 5A:
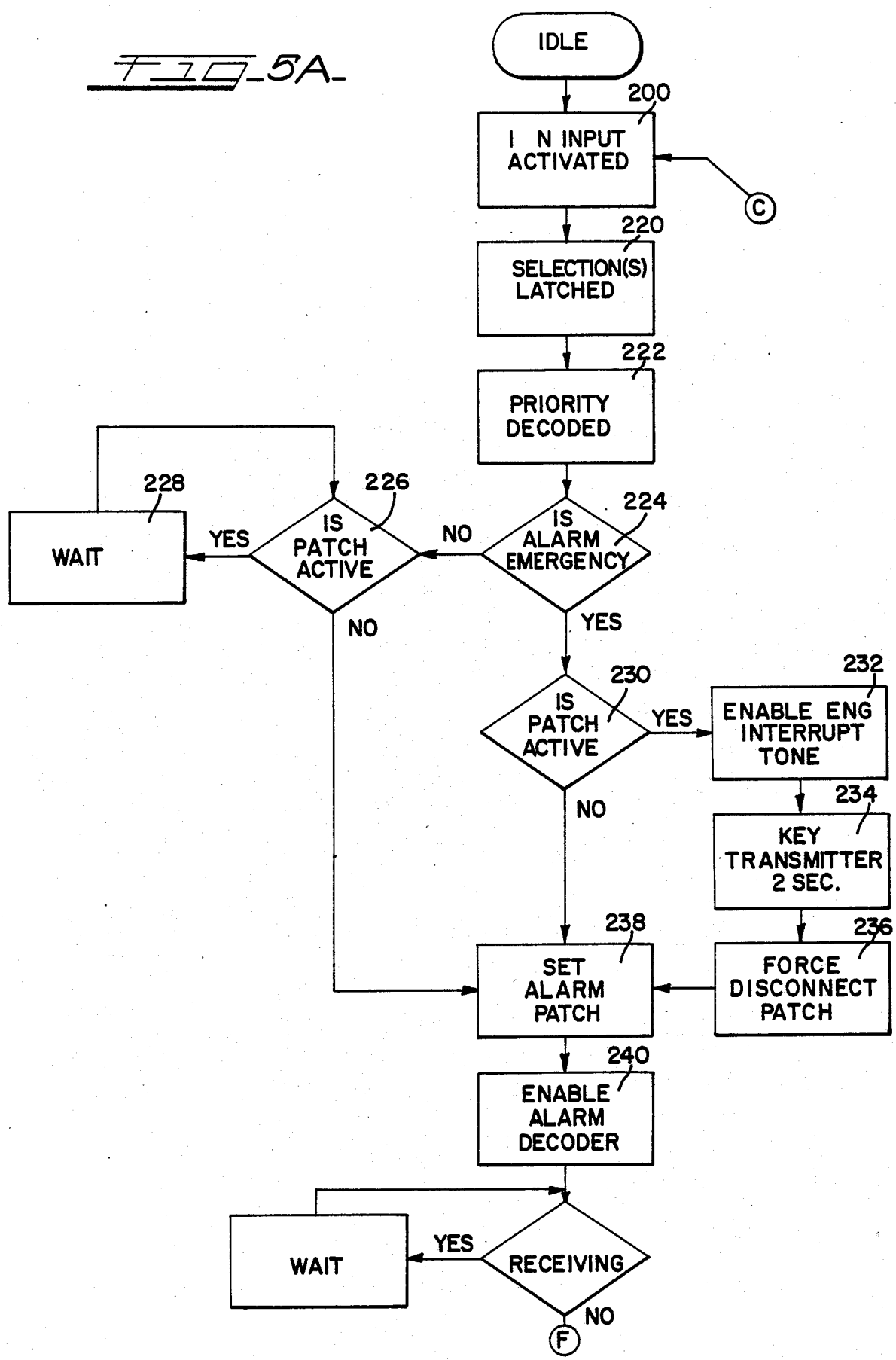
Figure 5B:
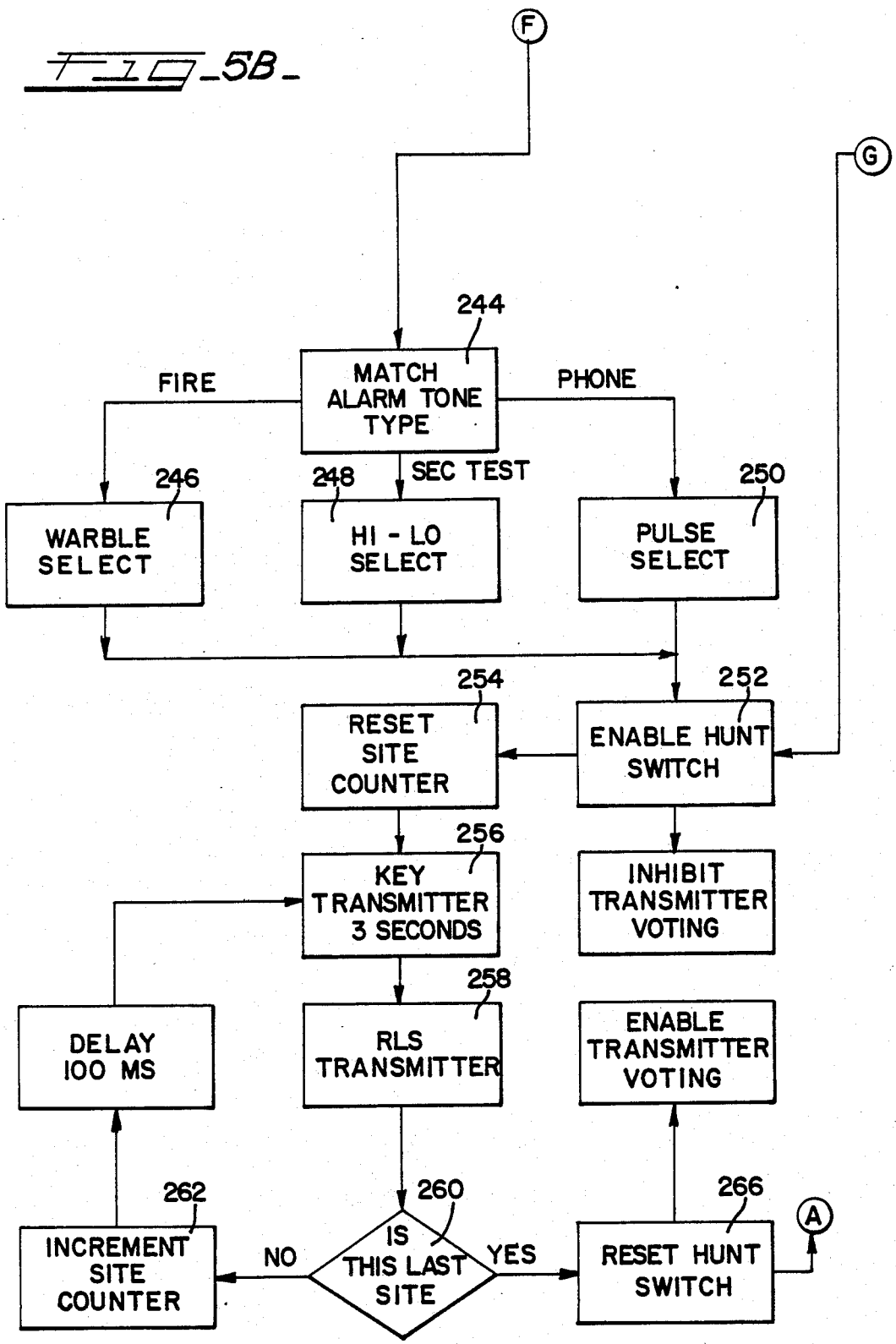
Figure 5F:
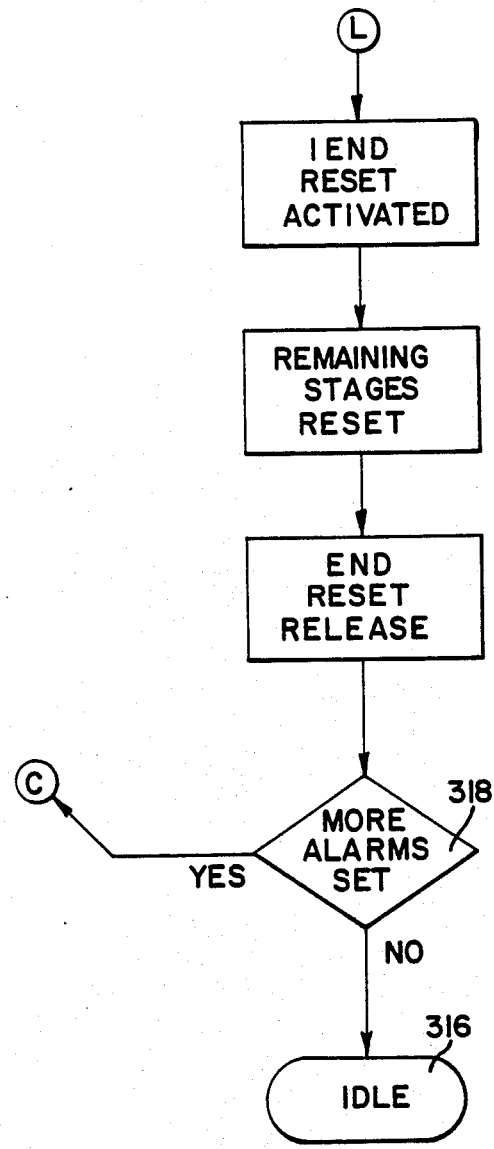

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

With respect to the figures, FIG. 1 illustrates in block diagram form an embodiment of an alarm sensing system 10 in accordance with the present invention. The system 10 includes an electronic control unit 12 which in the present embodiment is disclosed as a hard wired unit. The control unit 12 could just as readily can be implemented by means of a microprocessor with a stored program. The control unit 12 is electrically connected to a recorded message unit 14. The unit 14 is used to store and to play back a plurality of prerecorded alarm identification and location specification messages. The control unit 12 is also electrically coupled to a plurality of transceivers 16 through 22. The actual number of transceivers utilized in a given installation depends on the size and configuration of the installation and is not a limitation of the present invention.

A plurality of portable receiver-transmitter units 26 is also usable in connection with the system 10. The portable units, such as 26, are intended to be worn by security personnel or officers who are located throughout the facility. By means of the portable units, such as 26, such personnel can communicate or respond to the system 10. Each of the portable units, such as 26, includes a push button pad and circuits for generating standard telecommunications tones referred to as Dual Tone Multi-Frequency (DTMF) tones hereafter. The control unit 12 includes provisions for receiving a plurality of alarm conditions on one or more lines 28 and one or more phone calls on one or more lines 30. The control unit 12 also includes provisions to generate outgoing phone calls on one or more outgoing phone lines 32.

The system 10 is usable in a variety of facilities such as shopping malls or office buildings wherein security personnel or officers are physically separated from a central control room wherein the system 10 might be located but yet need to be in contact with the system 10 either to provide information thereto or receive messages therefrom. The alarm units coupled to the lines 28 can be standard fire, smoke, intrusion or liquid flow alarms. The particular types of sensor units do not represent a limitation of the present invention.

The system 10 is illustrated in greater detail in block diagram form in FIG. 2. The corresponding elements of FIG. 2 are identified with the same identification numerals as were used in FIG. 1. As can be seen from FIG. 2, the control unit 12 includes alarm signal processing circuitry 40. The alarm signal processing circuitry 40 serves as input circuitry for all alarm functions which are sensed on the lines 28. Additionally, the alarm signal processing circuitry 40 includes provisions for receipt of incoming phone messages on the lines 30. Outputs from the alarm signal processing circuits 40 are coupled to common control circuitry 42. The common control circuitry 42 is in turn coupled to transmitter control circuitry 44 and message control circuitry 46 for the purpose of generating signals for and/or messages to be transmitted by the transceivers 16 through 22.

The common control circuitry 42 is also coupled to receiver control circuitry 48 for the purpose of receiving and sensing acknowledge messages from the portable unit, such as 26, or other communications therefrom. The common control circuitry 42 is also coupled to outgoing dialer control circuitry 50 for the purpose of generating outgoing phone messages on the lines 32 in connection with sensed alarm conditions or in connection with messages generated by one or more of the portable units such as the unit 26.

When an alarm condition is sensed on one of the lines 28 by the alarm signal processing circuitry 40, the common control circuitry 42 selects a tone to be transmitted, via the transmitter control circuitry 44 to the remote portable unit 26. The operator carrying the unit 26 responds within a predetermined time interval with a pre-selected acknowledge signal. Once the common control circuitry 42 senses that the pre-selected acknowledge code has been received, an audio message is selected from the message unit 14. The selected message is transmitted via the message control circuitry 46, and transmitter control circuitry 44 to the portable unit 26. This audio message can specify the type of alarm condition as well as its location. The common control circuitry 42 then awaits a second acknowledge signal from the remote unit 26.

The use of audio messages such as provided by the message unit 14 is especially desirable. Such messages are readily comprehended even though the officer carrying the portable unit, such as the unit 26, might be otherwise occupied. If the first or second acknowledge codes are not received by the common control circuits 42, the dial control circuitry 50 can be used to place an out-going call seeking assistance.

FIGS. 3A–3D together disclose a detailed schematic diagram of the control system 10 of FIG. 2. With respect to FIG. 3A, a plurality of standard ADT alarms, which might be flow alarms, fire alarms or smoke alarms 60 are illustrated coupled via the plurality of wires 28 to a group of alarm latches 62 located in the alarm signal processing circuitry 40. The alarm latches 62 provide an input point for all of the alarm functions generated on the lines 28. The alarm latches 62 include eight relay buffered circuits which accept the alarm signals. The actual number of alarms which can be accepted is not a limitation of the present invention. Once an alarm signal has been received by the alarm latch circuitry 62 a signal responsive thereto is generated and a latch, which could be formed as an RS flip flop, is set.

Outputs on the lines 64 from the alarm latch circuitry 62 are coupled to a priority decoder circuitry 66. The priority decoder combinational circuitry 66 senses which of the lines 64 identified as S0–S7 are active, potentially indicating the presence of more than one alarm, and then generates an output on lines 68 indicative of the highest priority alarm sensed. The priority decoder circuitry 66 could be implemented, for example, by means of a 74LS138 decoder circuit. Output signals from the priority decoder circuitry 66 are fed through a priority decoder splitter circuit 70. Outputs from the splitter circuit 70 are provided on a plurality of lines 72 and identify whether a fire alarm, test signal phone or "Priority 1" alarm has been detected. The FCT Latch circuit, implementable as an SN7475 latch stores a binary code for the highest priority alarm condition. The FCT Decoder circuit, implementable as a 74LS138 binary to one-of-eight decoder generates a signal on one of eight lines indicating the current, highest priority alarm condition.

Outputs from the priority decoder splitter circuity 70 via a collector gate 74 are coupled through control and starting circuitry 76 to a transmitter control, circuit 78. The purpose of the transmitter control circuit 78 is to grant transmit requests only when there is no signal being received by one of the system transceivers, such as the transceivers 16 through 22.

Signals from the priority decoder splitter circuitry 70 on the lines 72 also simultaneously activate tone selector circuity 80. The tone selector circuit 80 selects the appropriate alert tone to be transmitted to the portable unit, such as the unit 26, and initiates a transmitter search sequence. Outputs from the tone selector 80 on a plurality of lines 82 are coupled to a tone generator circuit 84 which generates an appropriate alert tone for either fire, test or phone messages to be transmitted to the portable unit or units.

Outputs from the tone selector circuitry 80 via a search start one-shot circuit 86, via a search inhibit flip flop 88 which triggers an eight state transmit counter 90 are coupled via three lines 92 to a transmitter selector switching circuit 94 which can be set for the number of transceivers in the system. In the exemplary embodiment four transceivers 16 through 22 are provided. An attempt counter 96 is used to keep track of the number of attempts which have been made to locate an operator, first with an alert tone and then with the number of attempts to pass the message thereto once the operator has been reached. The attempt counter 96 can be a binary counter.

An operator or officer acknowledges receipt of an alert tone previously transmitted by depressing the "zero" on the keyboard of the remote unit 26. An acknowledge signal is then transmitted by the remote unit 26 and is sensed by one or more of the transceivers 16–22. A voting receiver selector circuit 98 selects the one receiver that has the strongest signal. That signal via a General Electric DESKON II-type controller 100 transfers the incoming acknowledge signal, the "zero", to a DTMF decoder 102. A decoded signal is generated by the DTMF decoder 102 on a line 103 to trigger a "zero" acknowledge switch 104 in the event that the "zero" has been transmitted by the operator.

The sensed zero signal on a line 106 sets a zero acknowlegde latch 108. In response to the "zero" signal being sensed by the latch 108 sequence control circuitry 110 via a message start gate 112 initiates a message selection based on the type of alarm condition and location sensed in the alarm latch circuitry 62. The message selector circuitry 114 generates signals for the recorded message unit 14, a commercial unit known as a McKenzie Message Repeater. Audio messages on lines 116 are communicated from the message repeater unit 14 to dialer control circuitry 50 for the purpose of generating an outgoing phone message on the line 32. Audio messages are also coupled via a line 118 through an audio switch 120 and the DESKON II controller 100 to the receiver voting selector circuit 98 and are in turn transmitted via the transceiver, which has been selected, to the remote unit 26.

A message acknowledge switch 126 senses the presence of an acknowledge signal from the decoder 100 indicating that the portable unit, such as the unit 26, has received the audio message. If no acknowledge signal has been received, the message acknowledge switch 26 will via the attempt counter 96 retransmit the message to the portable unit 26 again.

The transmitter selector circuitry 94 operates under the control of the receiver voting selector circuitry 98 at all times. This results in the transceiver being selected which corresponds to the receiver which has just received the strongest signal from the remote unit 26. A logging recorder 130 automatically records all transmissions and receptions for later usage.

The functioning of the circuity of FIGS. 3A–3D can be further understood with reference to the flow diagram of FIG. 4.

With respect to FIG. 4, operation of the circuitry of FIGS. 3A–3D is illustrated by an overall block diagram. When an alarm condition is sensed in a step 200 by the alarm latch circuitry 62 in the system 10, a tone is generated at a portable unit, such as unit 26 in a step 202. Assuming the operator or officer properly acknowledges the receipt of the tone in a step 204 by sending a "zero" to the control system 10, an audio message is transmitted in a step 206 specifying the type of alarm and the location thereof. Subsequent to the audio message having been sent, the operator or officer is again expected to acknowledge receipt of the message in a step 208. If the message is acknowledged as expected by the system 10, the system 10 exits and waits for a subsequent alarm condition to occur. In the event that the message is not acknowledged in the step 208 within a predetermined time-out period, in a step 210, the message is repeated up to four times. In the event that no acknowledgement of the message is received during any of the four retries, in a step 212 the system 10 via the dialer control circuitry 50 dials and generates an external assistance message.

FIGS. 5A–5H illustrate in more detail the operation of the system 10 of FIGS. 3A–3D. When the alarm condition is sensed in the step 200 by having one of the input lines 28 being activated, the appropriate latch or latches in the alarm latch circuitry 62 are set in a step 220. The alarm condition priorities are then decoded in a step 222 in the priority decoder circuitry 66. A decision is made in the priority decoder splitter 70 as to whether or not the alarm is an emergency in a step 224. If it is not an emergency, the condition of the phone patch 132 is sensed in a step 226. If the phone patch is active, indicating the presence of a call on the telephone line 32a, the system waits in a step 228.

In the event that the alarm is an emergency and is so detected in the step 224 the status of the phone patch 132 is checked in a step 230. If the phone patch 132 is busy, in view of the emergency alarm condition, an emergency interrupt tone is generated in a step 232. This tone results in the selected one of the transceivers 16 through 22 being keyed for two seconds in a step 234. Immediately thereafter, in a step 236, the phone patch 132 is disconnected by the system 10 and in a step 238 the corresponding alarm latch is set. An alarm decoder is then enabled in a step 240. Once the alarm condition has been received in a step 242 a match takes place in a step 244 to determine whether or not the presence of a fire alarm, a phone alarm or security test is to be announced. In the event that a fire or a flow alarm is to be announced, in a step 246 a warble tone is selected to be transmitted to the portable unit. In the event that a security test has been sensed a different, high-low, tone is selected to be sent. In the event that a signal has been received indicating an incoming phone call, yet another tone is selected in a step 250. Subsequently, in a step 252, the transmitter selector circuitry 94 of the system 10 is enabled so that selected tone can be broadcast via all transceiver 16–22. The transmitter counter 90 is reset in a step 254 and the selected transmitter is then keyed with the appropriate tone in a step 256.

In a step 260 the system 10 checks to see whether or not the transmitter counter 90 has counted through its maximum count. If not, it is incremented in a step 262 and after a delay of 100 milliseconds in a step 264 the new selected transmitter is keyed.

Subsequent to the warning tone having been sent to all sites, in a step 266 the hunting switch is reset. In a step 268 the system 10 determines whether or not a phone call has been detected. If not, the attempt counter 96 is incremented in a step 270 and the acknowledge gates are enabled in a step 272. A twenty second delay timer is then energized in a step 274 and the system waits to determine whether or not an acknowledge "zero" has been received in a step 276. If the acknowledge "zero" is sensed in the step 276, in a step 278 the attempt counter 96 is reset along with the acknowledge gates in a step 280. The voter selector 98 is then sensed in steps 282, 284 to determine if that device has received a message through one of the transceivers 16 through 22. Once the noting selector 124 ceases to receive the message, in a step 286, an appropriate message, prerecorded on the message repeater 14 is selected and started in a step 288. The selected transmitter is keyed in a step 290 and upon the end of message having been detected the transmitter is turned off in a step 292.

The attempt counter 96 is then incremented in a step 294. The acknowledge gates are then enabled in a step 296 and a 20 second delay timer is triggered in a step 298 to give the operator or officer a further opportunity to respond to the message. An acknowledge code is checked for in a step 300 and in the event that the expected acknowledge signal has been received in a step 302, the voting selector 98 is again sensed and the selected site is set in a step 304. Upon completion of the incoming message in a step 306 the attempt counter 96 is again reset and an acknowledge message is selected in a step 308 to be sent to the remote unit, such as the unit 26. The selected transmitter from the plurality of 16 through 22 is then keyed in a step 310. When the end of message signal is sensed, the transmitter is released in a step 312. The select and hold latch is released in a step 314 and in subsequent steps the system 10 resets itself and enters an idle state 316 if no further alarms are sensed. If further alarms are sensed in a step 318, the system returns to the step 200 for further processing.

If in the step 276 an acknowledge "zero" has not been detected, within the delay timer interval which is checked in a step 320, the status of the attempt counter 96 is checked in a step 322. If the last attempt has not yet taken place, the hunt switch is re-enabled in the step 252 and the alert tone is re-broadcast throughout the entire facility. In the event that the last attempt has taken place the system 10 automatically generates an external call for assistance via the phone patch 132 in a step 324.

The steps involved in making the call for external assistance include starting the dialer 51 in a step 330, locking out the transmitters in a step 332, sensing whether the line has gone off hook in a step 334, dialing the predetermined number in a step 336, waiting for a predetermined time interval in a step 338 to provide for ringing the line, sensing whether a predetermined control signal has been decoded in a step 340 and playing an assistance seeking prerecorded announcement in a step 342.

After the prerecorded announcement has been played in the step 342 the non-acknowledged message is transmitted over the phone line in a step 346. A control signal from the tape is decoded in a step 348. The DTMF decoder 102 is connected to the line in a step 350. If a call abort signal is detected in a step 352 the decoder is disconnected in a step 354, the acknowledge message is transmitted in a step 356, the system 10 disconnects itself from the line in a step 358, the dialer 51 is locked out in a step 360 and when an end of tape signal is sensed in a step 362 the system 10 returns to the step 314 for reset processing.

In the event that a call abort signal is not sensed in the step 352 and the system is not at the end of tape, the DTMF decoder 102 is disconnected in a step 364, the system returns to its "on hook" condition via the dialer 51 in a step 366 and then the next call is initiated in a step 368.

Figure 6A:
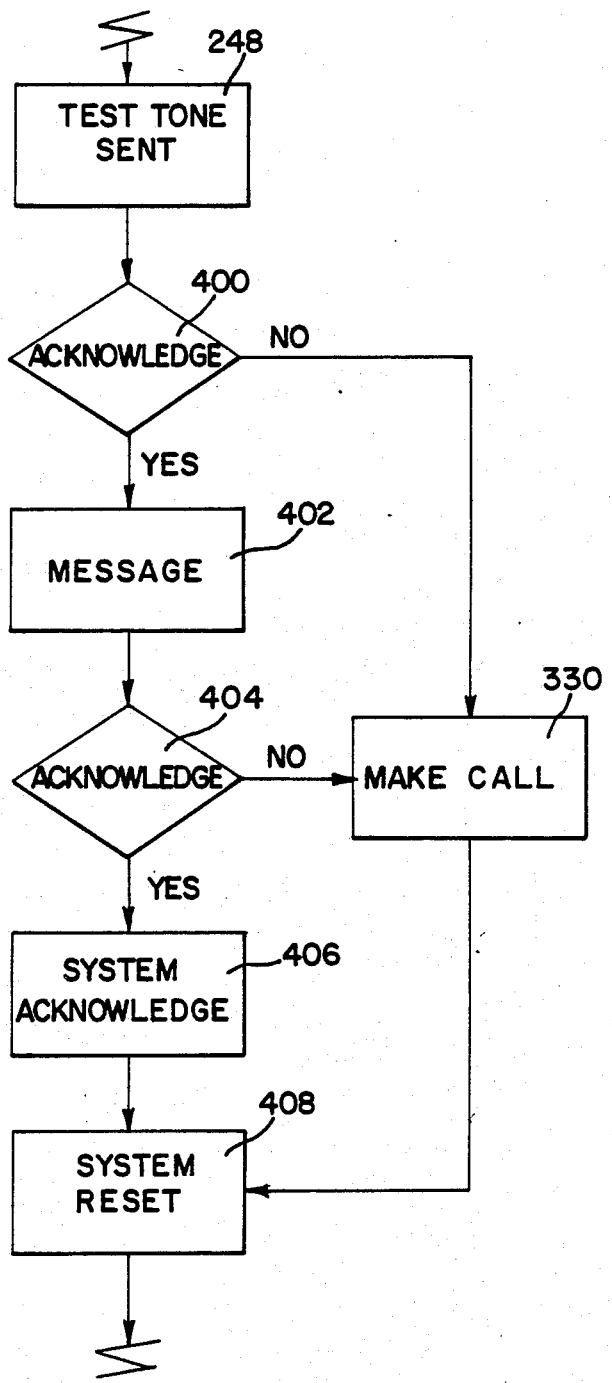
FIG. 6A–6C disclose a flow diagram illustrating further aspects of the operation of the alarm sensing system of FIGS. 3A–3D.

FIG. 6A illustrates the overall flow control of the system 10 in connection with a system test. When the appropriate test tone is broadcast in the step 248 the system 10 waits in a step 400 to determine if it has been acknowledged. If not, it enters the step 330 to make the necessary call for assistance. If the test tone is properly acknowledged, the message is sent in a step 402 as set forth in detail in FIG. 5. After the message is sent in the step 402 informing the operator that a test is taking place, the system 10 waits to receive a second acknowledge signal from the operator in the step 404. If the operator properly acknowledges the test message the system then generates its own acknowledge signal in a step 406 and resets itself in a step 408 while awaiting additional alarms.

Figure 6B:
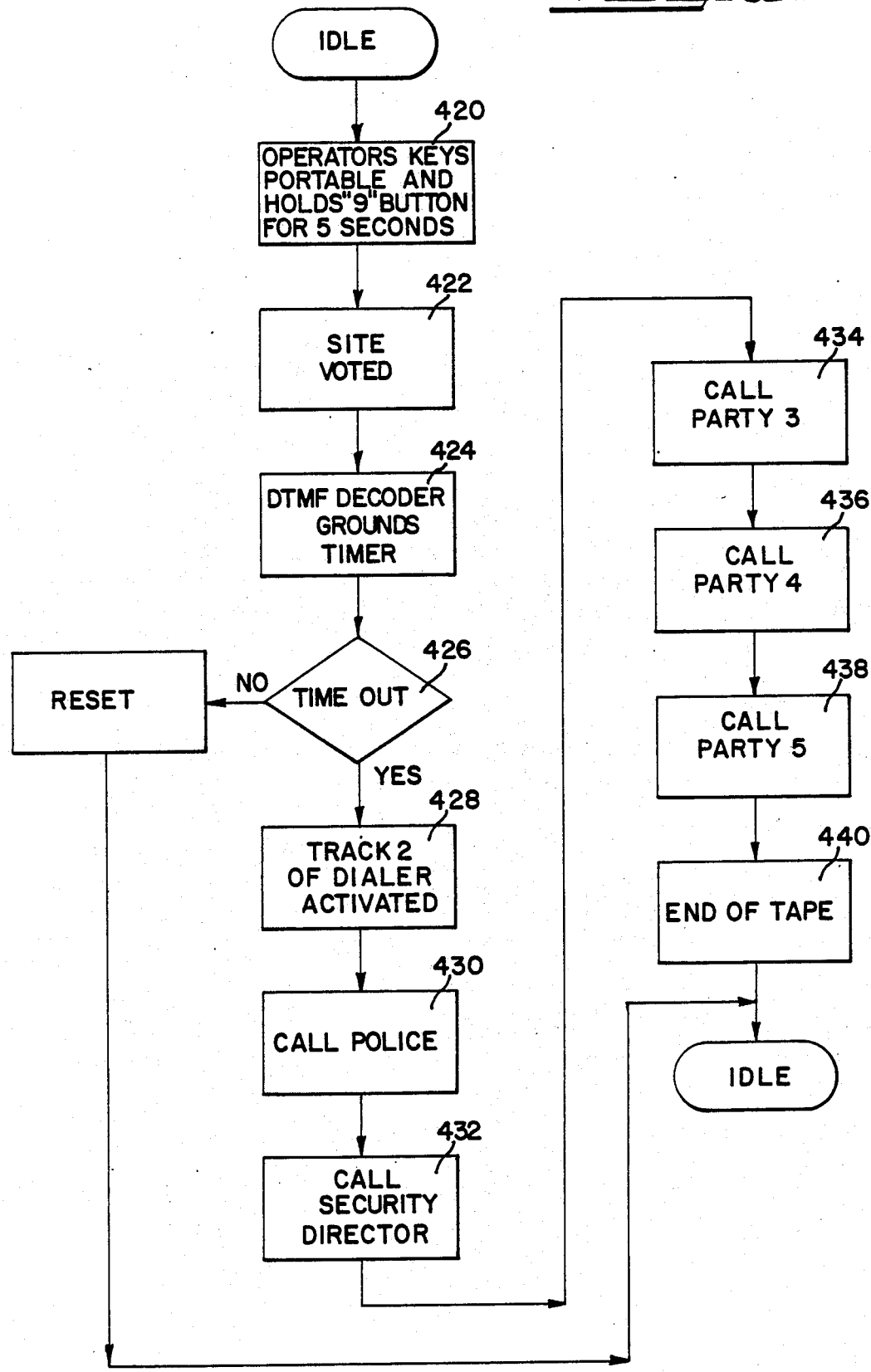

The block diagram of FIG. 6B illustrates the steps the system 10 executes in connection with receiving an emergency signal from the operator via the portable unit 26. If an emergency develops in which the operator needs assistance, the operator keys the control pad on the portable unit 26 by pushing the "9" button for five seconds in a step 420. The control system 10 by means of the voting selector 98 selects the receiver with the strongest signal in a step 422. In a step 424 the DTMF decoder 102 triggers a time out timer to determine whether or not the "9" button has been depressed for five seconds. If so, in a step 428 an emergency track of the dialer 51 is initiated which in a step 430 will place an assistance call to the local police. Subsequently in steps 432 through 438 additional parties can be automatically called once the police have been called. When an end of tape signal is sensed in a step 440 the system 10 reenters its idle state.

Figure 6C:
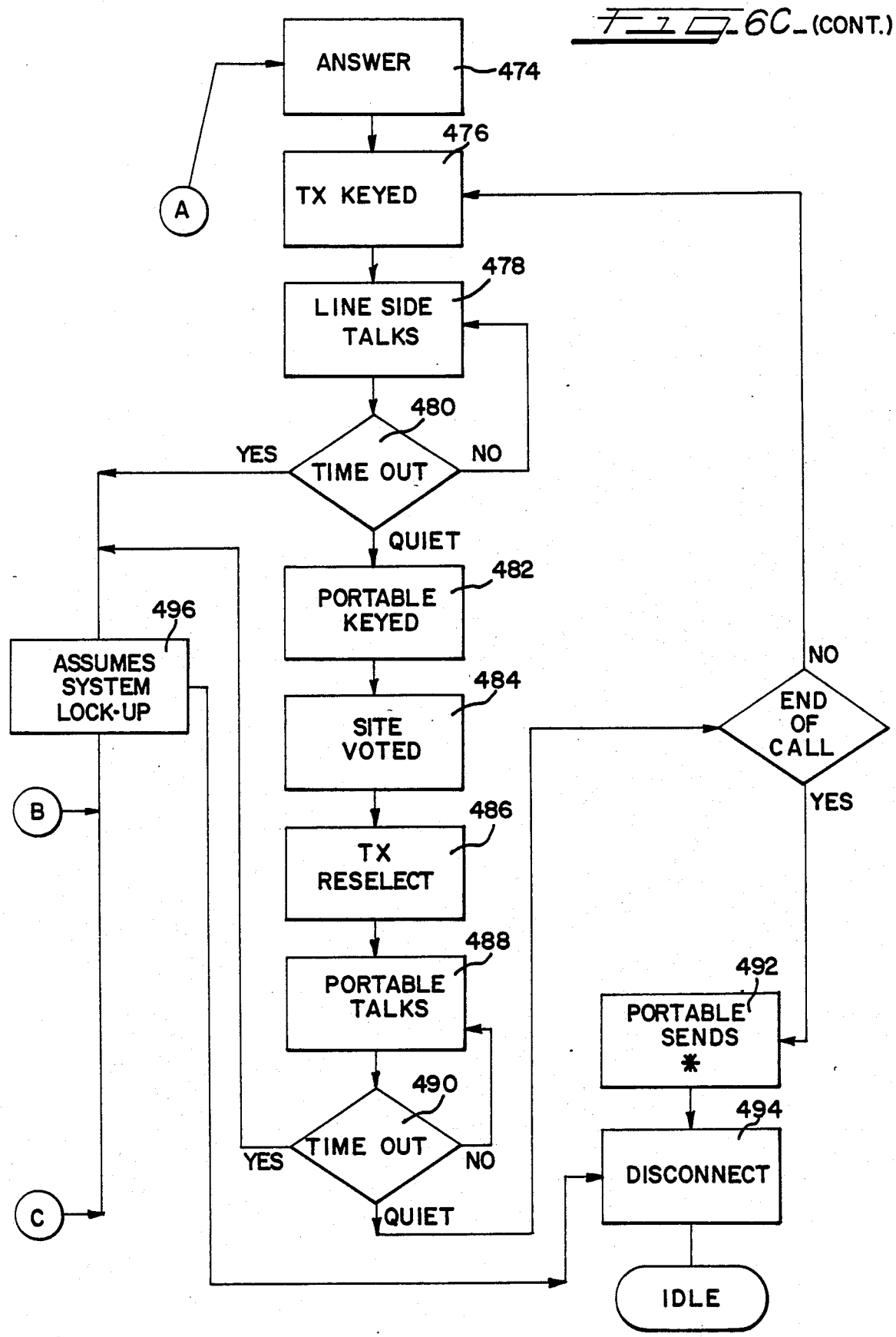

FIG. 6C illustrates a flow diagram for the control system 10 when an operator or officer wishes to initiate an outgoing phone call through a remote unit such as the unit 26. In a step 450 the operator keys the remote unit. The signal from the remote unit in a step 452 is received by one or more of the transceivers 16 through 22 and the transceiver which receives the strongest signal is selected by the voting selector 98 in the step 452. Simultaneously the corresponding transmitter is also selected in a step 454. When the operator depresses the "#" key on the remote unit 26 in a step 456 the decoder 102, upon sensing the "#" signal in a step 458 couples the phone patch 132 to the telephone line 32a. In a step 460 a 30 second lock up detector is turned on. The lock up detector senses whether or not the phone patch is held in a transmit mode or in a receiver mode for longer than thirty seconds at a time. If this is the case, the lock up detector will terminate the call and disconnect the phone patch from the line based on the assumption that either line noise or a busy tone has captured the line. In a step 462 the selected transmitter transmits a two second dial tone to the portable unit 26. The operator then keys the desired telephone number into the portable unit 26 in a step 464. A receiver is selected in a step 466, a transmitter is selected in a step 468, and the number is dialed in a step 470. The selected transmitter in a step 472 transmits to the portable unit 26 either a ringing or a busy signal.

Assuming the dialed phone is answered in a step 474, the selected transmitter is keyed in a step 476 and the answering party is able to speak in a step 478. If the initial response does not exceed the 30 second time out interval as checked in a step 480, the portable unit 26 is keyed in a step 482 and a corresponding receiver is selected in a step 484. The corresponding transmitter is selected in a step 486 and the operator or officer can then speak through the portable unit 26 in a step 488. Assuming that the period of time of the officers speaking is less than the thirty second time-out interval as sensed in a step 490 the initial party can again respond. At the end of the call the operator sends an asterisk in a step 492 which causes the control system 10 to disconnect the line in a step 494 with the system then becomes idle until a further input is receive.

In the event that the thirty second time-out interval as sensed by the step 490 the thirty second lock-up detector assumes in a step 496 that the system has locked up and forces a disconnect.

The transceivers, such as 16 through 22, can each be a General Electric Century II five watt FM radio. The portable units, such as the unit 26, can be four watt General Electric MPX hand held radios with a DTMS dial on the front. The dial as noted previously is used for responding to test conditions, alarm conditions, as well as for making and receiving outside phone calls.

With respect to the electronic circuitry of FIGS. 3A-3D, the alarm latches 62, the priority encoder 66, the decoder splitter 70, the tone selector 80, the tone generator 84, the transmitter control 78, the attempt counter 96, the transmitter counter 90 and the transmitter selector circuitry 94 can all be implemented out of commercially available cards or 7400 type integrated circuits. Other elements of the circuitry of FIGS. 3A-3D including the voting receiver selector 98, the message repeater 14, the DESKON II controller 100, and the phone patch 132 are commercially available modules.

The voting selector 98 is a General Electric Model VSDC; the message separator 14 is a McKenzie Model APR-6/CNC; the controller 100 is a General Electric DESCON II Model 511A1B1; the Dialer is a Napco Security Systems Mark 5000; the phone patch 132 is a SYT850; the logging recorder is a JEI Model 803; and the DTMF Decoder is a Data Signal Model NND328.

While a particular embodiment has been disclosed, it will be understood that the invention is not limited thereby. In yet another embodiment of the invention, the electronic circuitry of FIGS. 3A-3D could be replaced, in part, by a microprocessor in combination with a stored program.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. An alarm system comprising:
    means for sensing a selected alarm condition;
    control means, coupled to said sensing means, for processing said sensed alarm condition and for generating an alert signal responsive thereto;
    means, coupled to said control means, for transmitting said alert signal throughout a selected region;
    a portable receiver-transmitter unit for receiving said alert signal and for generating an audio indicia thereof including manually operable means for generating an acknowledge signal responsive to said alert signal;
    means, coupled to said control means, for receiving said acknowledge signal;
    means, coupled to said control means, for generating and transmitting to said portable unit a verbal directive identifying the sensed alarm and location thereof;
    means coupled to said control means, for sensing a second acknowledge signal; and wherein said unit includes means for generating said second acknowledge signal in response to receiving said verbal directive.

2. An alarm system in accordance with claim 1 wherein said means for transmitting includes a plurality of transmitters and means, coupled to said plurality of transmitters, for selecting one member of said plurality.

3. An alarm system in accordance with claim 2 including a plurality of receivers coupled to said means for selecting one member of said plurality.

4. An alarm system in acordance with claim 2 wherein said control means includes means for generating a plurality of alert signals spaced apart a selected amount in time and spatially distributed in a selected region by said plurality of transmitters.

5. An alarm system in accordance with claim 4 wherein said means for receiving said acknowledge signal includes means for sensing a predetermined elapsed time interval and for activating said means for generating a plurality of alert signals in response to a failure to sense said acknowledge signal within said predetermined time interval.

6. An alarm system in accordance with claim 5 including means for telephonically transmitting a selected message to a predetermined destination in response to a failure to receive said acknowledge signal within a predetermined time interval.

7. An alarm system in accordance with claim 4 including means for generating a system test condition signal, means for transmitting said system test condition signal to said unit and means for detecting a selected acknowledge signal from said unit in response thereto.

8. An alarm system in accordance with claim 7 wherein said means for generating a verbal directive includes means for storing a plurality of verbal directives or messages including means for selecting a predetermined message to be transmitted.

9. An alarm system in accordance with claim 4 including means for sensing a selected emergency signal initiated by said unit and for transmitting via a selected channel an assitance requesting message in response thereto.

10. An alarm system in accordance with claim 9 including:
    means for detecting an incoming phone call;
    wherein said means for generating a plurality of alert signals includes means for generating a selected alert signal in response to said detected phone call;
    means for transmitting said detected phone call to said unit; and
    means affixed to said unit, enabling an operator to verbally respond to said detected phone call.

11. An alarm system in accordance with claim 10 including further:
    means, affixed to said unit for initiating a phone call; and
    wherein said control means includes means for dialing a selected telephone number.

12. A method of sensing an alarm condition comprising:
    sensing a selected alarm condition;
    generating an alert signal responsive thereto;
    transmitting said alert signal throughout a selected region;
    receiving said alert signal and generating an audio indicia thereof;
    generating an acknowledge signal responsive to said alert signal;
    receiving said acknowledge signal;
    generating a verbal directive identifying the sensed alarm and location thereof in response to said acknowledge signal; and sensing a second acknowledge signal in response to said verbal directive.

13. A method in accordance with claim 12 including generating a plurality of alert signals spaced apart a selected amount in time and spatially distributed in a selected region.

14. A method in accordance with claim 13 including sensing a predetermined elapsed time interval and for generating a plurality of alert signals in response to a failure to sense said acknowledge signal within said predetermined time interval.

15. A method in accordance with claim 14 including transmitting a selected message to a predetermined destination in response to a failure to receive said acknowledge signal within said predetemined time interval.

16. A method in accordance with claim 13 including generating a system test condition signal, transmitting said system test condition signal throughout the selected region and detecting a selected acknowlege signal in response thereto.

17. A method in accordance with claim 16 including storing a plurality of verbal directives or messages and including selecting a predetermined message to be transmitted.

18. A method in accordance with claim 13 including sensing a selected emergency signal and transmitting via a selected channel an assistance requesting message in responce thereto.

19. An alarm system usable in a selected region having a plurality of fixed sensor units distributed throughout the region, the system being usable for detecting an alarm signal generated by one or more of the fixed sensor units, for initially signalling an operator located somewhere within the region and carrying a portable unit and for then signalling remote personnel in the event that the operator carrying the portable unit fails to respond, the system comprising:

means, electrically connected to the sensor units, for detecting an alarm signal;

control means, coupled to said detecting means, for processing said detected alarm signal and for generating an alert signal responsive thereto;

means including a plurality of transceivers, coupled to said control means, for transmitting said alert signal throughout the selected region;

a portable receiver-transmitter unit for receiving said alert signal and for generating an audio indicia thereof including manually operable means for generating, essentially immediately, an acknowledge signal responsive to said alert signal;

means, coupled to said control means, for receiving and for detecting the presence or absence of said acknowledge signal within a predetermined period of time;

means, coupled to said control means, for generating and transmitting to said portable unit a verbal message identifying the detected alarm in response to the detected presence of said acknowledge signal; and means, coupled to said control means, for generating and transmitting to remote personnel a verbal message in response to the detected absence of said acknowledge signal.

* * * * *